US012558867B2

(12) United States Patent
Mitsuoka et al.

(10) Patent No.: US 12,558,867 B2
(45) Date of Patent: Feb. 24, 2026

(54) MOLDING BASE MATERIAL, MOLDED PRODUCT USING SAME, AND PRODUCTION METHOD THEREFOR

(71) Applicants: Toray Industries, Inc., Tokyo (JP); Du Pont-Toray Co., Ltd., Tokyo (JP)

(72) Inventors: Hideto Mitsuoka, Nagoya (JP); Hiroshi Kiyama, Nagoya (JP); Yukitane Kimoto, Nagoya (JP); Hideaki Machida, Tokyo (JP); Masakazu Okui, Tokai (JP)

(73) Assignee: Toray Industries, Inc., Tokyo (JP)

( * ) Notice: Subject to any disclaimer, the term of this patent is extended or adjusted under 35 U.S.C. 154(b) by 238 days.

(21) Appl. No.: 18/027,146

(22) PCT Filed: Sep. 24, 2021

(86) PCT No.: PCT/JP2021/035148
§ 371 (c)(1),
(2) Date: Mar. 20, 2023

(87) PCT Pub. No.: WO2022/071141
PCT Pub. Date: Apr. 7, 2022

(65) Prior Publication Data
US 2024/0025145 A1 Jan. 25, 2024

(30) Foreign Application Priority Data

Sep. 29, 2020 (JP) ................................ 2020-163141

(51) Int. Cl.
| | |
|---|---|
| B32B 5/26 | (2006.01) |
| B29C 70/30 | (2006.01) |
| B29C 70/88 | (2006.01) |
| B32B 27/12 | (2006.01) |
| B32B 27/28 | (2006.01) |

(52) U.S. Cl.
CPC ............... *B32B 5/26* (2013.01); *B29C 70/30* (2013.01); *B29C 70/88* (2013.01); *B32B 27/12* (2013.01); *B32B 27/281* (2013.01); *B32B*

*2260/021* (2013.01); *B32B 2260/046* (2013.01); *B32B 2262/101* (2013.01); *B32B 2262/106* (2013.01); *B32B 2307/302* (2013.01); *B32B 2605/00* (2013.01)

(58) Field of Classification Search
CPC ................................ B29C 70/30; B29C 70/88
See application file for complete search history.

(56) References Cited

U.S. PATENT DOCUMENTS

| | | | |
|---|---|---|---|
| 11,230,810 B2 | 1/2022 | Machida et al. | |
| 2017/0157889 A1* | 6/2017 | Ishikawa | ................. B29C 70/46 |
| 2019/0232577 A1* | 8/2019 | Kaji | ...................... B29C 70/345 |

FOREIGN PATENT DOCUMENTS

| | | | | | |
|---|---|---|---|---|---|
| JP | 56056851 | A | * | 5/1981 | |
| JP | S56-56851 | A | | 5/1981 | |
| JP | H08-34095 | A | | 2/1996 | |
| JP | H08-276525 | A | | 10/1996 | |
| JP | 2002018993 | A | * | 1/2002 | |
| JP | 2015-143343 | A | | 8/2015 | |
| JP | 6580643 | B2 | * | 9/2019 | ............. D21H 13/26 |

OTHER PUBLICATIONS

International Search Report dated Nov. 30, 2021 in counterpart International Application No. PCT/JP2021/035148 w/English translation.
Written Opinion dated Nov. 30, 2021 in counterpart International Application No. PCT/JP2021/035148.

* cited by examiner

*Primary Examiner* — Virak Nguon
(74) *Attorney, Agent, or Firm* — DLA Piper LLP (US)

(57) ABSTRACT

A molding base material has at least a fiber-reinforced resin prepreg layer, a fiber paper layer, and a partition layer interposed between the prepreg layer and the fiber paper layer; a molded product obtained using the same; and a production method therefor. The resulting product makes it possible to achieve high thermal resistance and heat insulation as well as improved overall space efficiency and weight reduction in a fiber-reinforced resin molded product.

12 Claims, No Drawings

MOLDING BASE MATERIAL, MOLDED PRODUCT USING SAME, AND PRODUCTION METHOD THEREFOR

TECHNICAL FIELD

This disclosure relates to a molding base material in which a fiber-reinforced resin prepreg layer and a fiber paper layer are combined, a molded product molded using the molding base material, and a production method for the molded product.

BACKGROUND

Fiber-reinforced resin molded products are widely used in various applications, taking their advantage capable of realizing light weight, high strength and high rigidity. In the manufacture of fiber-reinforced resin molded products, prepreg, which is an uncured or semi-cured molding base material in which reinforcing fibers such as carbon fibers or glass fibers are impregnated with a matrix resin, is often used for molding (for example, JP-A-2015-143343).

A fiber-reinforced resin molded product may require thermal resistance, but the thermal resistance of a fiber-reinforced resin molded product is determined by the thermal resistance of the matrix resin. When a fiber-reinforced resin molded product is required to have a thermal resistance, conventionally, for example, the following manners have been employed:

(1) A resin having a high thermal resistance is selected as the matrix resin.

(2) The temperature of a molded product is controlled not to elevate.

(i) It is kept away from a high-temperature heat source.

(ii) A cooling device is installed between it and a high-temperature heat source (for example, blower air cooling).

(iii) A cooling mechanism is incorporated directly into a molded product (for example, water cooling pipes, cooling fins).

(iv) A heat insulating material is used together to suppress thermal conduction (for example, ceramic material, foam material).

(v) A reflective material is used together to reduce radiant heat (for example, a metal plate or metal foil).

However, all of the above-described methods have the following problems.

In the above-described method (1), there is a limit to the thermal resistance of the resin.

In the above-described method (2), additional cost is incurred, structure becomes complicated, weight increases, and space becomes necessary.

As a heat insulating material for suppressing thermal conduction small in the above-described method (2) (iv), recently, a fiber paper of a synthetic resin (fiber paper made of a nonwoven fabric, especially a polyimide fiber paper) has been proposed instead of ceramics and foam materials (for example, JP-B-6580643). That polyimide fiber paper has superior properties such as high heat insulation, high thermal resistance, thinness and light weight. Namely, the polyimide fiber paper is a paper prepared by making a paper in a manner similar to the production method of a Japanese paper, using polyimide resin fibers having a high thermal resistance or fibers prepared by micro-slitting a polyimide resin film having a high thermal resistance, it can exhibit a high heat insulation because it has gaps (air layer between fibers) inside. Since such a polyimide fiber paper having a high heat insulation can be formed into a thin layer while ensuring a desired heat insulation performance, as compared with foam materials or the like that are commonly used frequently as heat insulation materials (for example, JP-A-2002-18993), it is particularly suitable for when improvement of space efficiency and weight reduction are required when the installation space is narrow as a whole including the heat insulating material.

However, in applying such a polyimide fiber paper as described above to improve thermal resistance and heat insulation for a fiber-reinforced resin molded product, because the fiber paper will be joined to the molded product by post-processing, there are the following problems:

Joining takes time and effort, adhesives and pressure sensitive adhesives are required for joining, and there is a risk of peeling off from the molded product during use.

When the above-described polyimide fiber paper is applied to a molded product that is molded using the aforementioned fiber-reinforced resin prepreg, although it is considered to integrally mold the prepreg and the polyimide fiber paper to avoid post-processing that has the above-described problems, when merely integrally molding these, the following problem occurs. Namely, a problem occurs that, during integral molding, the resin of the prepreg permeates into the polyimide fiber paper, gaps in the fiber paper are filled (the air layer is eliminated or greatly reduced), and the excellent heat insulation that the polyimide fiber paper has is impaired.

It could therefore be helpful to provide a molding base material in which a prepreg of a fiber-reinforced resin and a fiber paper capable of exhibiting a high heat insulation with a thin layer are adequately integrated without impairing the high heat insulation of the fiber paper to achieve both of (a) a high thermal resistance and heat insulation of a fiber-reinforced resin molded product and (b) improvement of overall space efficiency and weight reduction; a molded product obtained using the molding base material; and a production method for the molded product.

SUMMARY

We thus provide:

(1) A molding base material characterized by having at least a fiber-reinforced resin prepreg layer, a fiber paper layer and a partition layer interposed between the prepreg layer and the fiber paper layer.

(2) The molding base material according to (1), wherein the fiber paper layer comprises a polyimide fiber paper layer.

(3) The molding base material according to (1) or (2), wherein the prepreg layer contains carbon fibers or glass fibers as reinforcing fibers.

(4) The molding base material according to any one of (1) to (3), wherein a matrix resin of the prepreg layer comprises a thermosetting resin.

(5) The molding base material according to any one of (1) to (4), wherein the partition layer is provided on at least one surface of the fiber paper layer, and another fiber paper layer different from the fiber paper layer is provided between the partition layer and the prepreg layer.

(6) The molding base material according to any one of (1) to (5), wherein the partition layer comprises a thermosetting resin.

(7) A molded product molded by heating and pressurizing the molding base material according to any one of (1) to (6).

(8) The molded product according to (7), having gaps in a range of 30-90% in the fiber paper layer.

(9) The molded product according to (7) or (8), wherein a glass transition temperature is in a range of 90-400° C.

(10) The molded product according to any one of (7) to (9), wherein a thermal conductivity of the fiber paper layer is 0.1 W/mK or less.

(11) The molded product according to any one of (7) to (10), wherein a metal layer is provided on at least one surface layer.

(12) The molded product according to any one of (7) to (11), which is used for any application for automobiles, motorcycles, urban air mobility, aircraft and satellites.

(13) A method of producing a molded product according to any one of (7) to (12), comprising at least steps A to C:

A. preparing a molding base material according to any one of (1) to (6);

B. forming the molding base material into a target shape; and

C. heating and pressurizing the formed molding base material.

Our fiber-reinforced resin prepreg layer and the fiber paper layer can be integrated via the partition layer interposed therebetween, and when the integrally formed molding base is molded by heating and pressurizing, intrusion of the softened or melted matrix resin of the prepreg layer into the fiber paper layer, at least into a part of the fiber paper layer, can be prevented by the partition layer, this makes it possible to prevent the gaps between the fibers inside the fiber paper layer from being filled with the intruding resin, the existence of the air layer inside the fiber paper layer is maintained, and the excellent heat insulation which the fiber paper layer has can be kept. Therefore, by subjecting the molding base material thus integrally formed to molding, molding into a complicated shape can be easily performed, and peeling of the fiber paper from the molded product can be securely prevented, and this makes it possible to mold a molded product with a desired shape and with high strength and rigidity due to the fiber-reinforced resin, and at the same time, by molding the fiber paper layer, which maintains the existence of the air layer, into the desired shape together with the prepreg layer, the molded product can exhibit a targeted high heat insulation. Further, since the fiber paper layer can be formed into a thin layer, the molded product, as a whole including the fiber paper layer as a heat insulating material, can be improved with space efficiency and reduced with weight. Furthermore, when the fiber paper layer comprises a polyimide fiber paper layer having a high thermal resistance, it also becomes possible to exhibit a high thermal resistance of the molded product together.

Further, according to our method of producing the molded product, as long as our molding base material as described above is prepared, through a forming step of a base material and a heating/pressurizing step of the formed base material similar to those in the conventional molding using only a prepreg base material, a molded product with a desired high heat insulation can be easily produced.

DETAILED DESCRIPTION

Our molding base material is characterized by having at least a fiber-reinforced resin prepreg layer, a fiber paper layer and a partition layer interposed between the prepreg layer and the fiber paper layer. These layers are preferably formed into an integrated base material as the molding base material, by stacking these layers.

The fiber-reinforced resin forming the prepreg layer comprises reinforcing fibers and a matrix resin impregnated into the reinforcing fibers, and the matrix resin is controlled in an uncured or semi-cured state (so-called B-stage state).

Although both discontinuous and continuous fibers can be used as the reinforcing fibers of the prepreg layer, it is preferred to use continuous reinforcing fibers when it is desired to give strength and rigidity at a certain level or more to the fiber-reinforced resin layer of a molded product. Further, when using continuous reinforcing fibers, it is preferred to use continuous reinforcing fibers aligned in one direction from the viewpoint of easiness of designing the strength and rigidity of the molded product. For example, as the fiber-reinforced resin prepreg layer in the molding base material, a structure of a single-layer fiber-reinforced resin prepreg layer comprising continuous reinforcing fibers aligned in one direction and a matrix resin, and a structure of a plurality of fiber-reinforced resin prepreg layers in which a plurality of prepreg layers each comprising continuous reinforcing fibers aligned in one direction and a matrix resin are stacked so that each layer has a desired reinforcing fiber orientation direction, can be employed.

The kind of reinforcing fibers is not particularly limited, and inorganic fibers such as carbon fibers and glass fibers, metal fibers, organic fibers and the like, can be exemplified. Two or more kinds of these may be used.

As the carbon fibers, for example, PAN-based carbon fibers made using polyacrylonitrile (PAN) fibers as the raw material, pitch-based carbon fibers made using petroleum tar or petroleum pitch as the raw material, cellulose-based carbon fibers made using viscose rayon, cellulose acetate or the like as the raw material, vapor-grown carbon fibers made using hydrocarbons or the like as the raw material, and graphitized fibers thereof and the like, can be exemplified. Among these carbon fibers, PAN-based carbon fibers are preferably used because they have an excellent balance between strength and elastic modulus.

As the glass fibers, for example, E glass fibers (for electrical use), C glass fibers (for corrosion resistance), S glass fibers, T glass fibers (high strength and high elastic modulus) and the like, can be exemplified.

As the metal fibers, for example, fibers comprising metals such as iron, gold, silver, copper, aluminum, brass, or stainless steel, can be exemplified.

As the organic fibers, for example, fibers comprising organic materials such as aramid, polybenzoxazole (PBO), polyphenylene sulfide, polyester, polyamide and polyethylene can be exemplified. As the aramid fibers, for example, para-aramid fibers that are excellent in strength and elastic modulus, and meta-aramid fibers that are excellent in flame retardancy and long-term thermal resistance, can be exemplified. As the para-aramid fibers, for example, polyparaphenylene terephthalamide fibers, copolyparaphenylene-3, 4'-oxydiphenylene terephthalamide fibers and the like can be exemplified, and as the meta-aramid fibers, polymetaphenylene isophthalamide fibers and the like can be exemplified. As the aramid fibers, para-aramid fibers having a higher elastic modulus than meta-aramid fibers are preferably used.

As other inorganic fibers, for example, fibers comprising inorganic materials such as basalt, silicon carbide and silicon nitride can be exemplified. Basalt fibers are fibers made from basalt which is a mineral, and fibers very high in thermal resistance.

As the matrix resin of the prepreg layer, either thermosetting resin or thermoplastic resin can be used. From the viewpoint of easiness of controlling the glass transition temperature as high as possible, and from the viewpoint that, when the molded product is used in a high temperature atmosphere, the molded product can maintain its structure without softening, and in an unlikely situation, it is carbonized, use of a thermosetting resin is preferred.

As the thermosetting resins as the matrix resin of the prepreg layer, for example, can be used unsaturated polyesters, vinyl esters, epoxies, phenols (resol type), urea/melamine, polyimides, their copolymers or modified products, a resin prepared by blending two or more of these and the like. Furthermore, an elastomer or rubber component may be added to the thermosetting resin, for example, to improve impact resistance. Among these, an epoxy resin is particularly preferable from the viewpoint of the strength and rigidity of the molded product.

The thickness of the fiber-reinforced resin prepreg layer or the molding base material is not particularly limited. However, considering the easiness of forming and molding of the molding base material and the good followability to a complicated shape, it is not preferred for the molding base material to be too thick. Therefore, the thickness of the molding base material is preferably 0.1 to 5 mm, more preferably 0.1 to 4 mm, further preferably 0.1 to 3 mm.

The ratio of reinforcing fibers in the fiber-reinforced resin prepreg layer is preferably 55 to 65% by volume, more preferably about 60% by volume, in a unidirectional prepreg (UD prepreg), from the viewpoint of moldability and mechanical properties. In a woven prepreg, it is preferably 45 to 55% by volume, more preferably about 50% by volume.

The fiber paper layer is preferably a dry or wet nonwoven fabric comprising synthetic fibers from the viewpoint of imparting a heat insulation to the molding base material. In particular, a fiber paper layer prepared by making synthetic fibers into a paper is preferred to form an appropriate air layer and impart a high heat insulation. Especially, to impart a high thermal resistance as well as a high heat insulation, the synthetic resin forming the fiber paper layer is preferably polyimide resin, and the fiber paper layer preferably comprises a polyimide fiber paper layer. As the polyimide fiber paper, the fiber paper proposed in the aforementioned JP '643 can be used. Except the polyimide fiber paper proposed in JP '643, for example, an aramid fiber paper, a polyphenylene sulfide fiber paper, or a fiber paper prepared by blending these fibers can be used.

The fiber paper used preferably has gaps (porosity at the stage of the molding base material) of 45 to 90% in the fiber paper layer from the viewpoint of heat insulation performance, more preferably 60 to 90%, and further preferably 70 to 90%. It is preferred that this porosity is maintained as much as possible even in the molded product after molding to ensure a high heat insulation of the molded product after molding. The molded product after molding preferably has gaps (porosity at the stage of the molded product) of 30 to 90% in the fiber paper layer, more preferably 45 to 90%, and further preferably 60 to 90%.

Although the thickness of the fiber paper layer is not particularly limited, if it is too thin, because the air layer inside it also becomes thin, there is a possibility that a desired heat insulation performance as the molded product may not be exhibited, and if it is too thick, since the fiber paper layer is essentially not expected to have a function of bearing the strength and rigidity of the molded product, there is a possibility that the strength and hardness of the surface layer of the molded product may become too small. Therefore, the thickness of the fiber paper layer is preferably 0.05 to 3.0 mm, more preferably 0.1 to 2.5 mm, further preferably 0.5 to 2.0 mm, both in the stage of the molding base material and in the stage of the molded product.

A partition layer is interposed between the fiber-reinforced resin prepreg layer and the fiber paper layer. The interposed partition layer has a function of suppressing a state that, when the molding base material is subjected to molding accompanying heating and pressurizing, the matrix resin of the fiber-reinforced resin prepreg layer is softened or melted by being heated and pressurized for molding, the softened or melted matrix resin of the prepreg layer intrudes (impregnates) into the inside of the fiber paper layer, at least a part of the gaps inside the fiber paper layer is filled (the air layer disappears or significantly decreases), and the excellent heat insulating property, which the fiber paper has, is injured. Namely, the partition layer is a layer having a function of preventing the matrix resin of the prepreg layer from intruding into at least a part of the fiber paper layer. On the other hand, a small amount of the matrix resin of the prepreg layer partially intrudes into the fiber paper layer during molding so that the prepreg layer and the fiber paper layer are firmly adhered after molding, thereby preventing each layer from peeling off during use of the molded product, and such a condition is preferred. At that time, it is important that the porosity of the fiber paper layer in the molded product is at least 30%. It is more preferably 45% or more, and further preferably 60% or more.

Therefore, the material and thickness of the interposed partition layer are not particularly limited as long as the partition layer has the function of preventing the matrix resin of the prepreg layer from intruding into at least a part of the fiber paper layer. As the material of the partition layer, for example, thermosetting adhesive sheets of polyimide-based, polyamideimide-based, epoxy-based, acrylic-based, urethane-based, polyester-based, phenol-based, urea-based, and melamine-based resins, or silicone-based resin adhesive sheets or the like can be used. An elastomer or rubber component may be added to the above-described thermosetting adhesive. Among these, an epoxy-based resin is preferred particularly from the viewpoint of adhesion with prepreg, and it is preferred to select an adhesive mainly composed of the same kind of component as the resin component of the prepreg.

The thickness of the partition layer is also not particularly limited, but if it is too thick, there is a possibility that the heat insulation may be reduced, and on the contrary, if it is too thin, there is a possibility that the above-described function of preventing the intrusion of the matrix resin of the prepreg layer into at least a part of the fiber paper layer may become too low. Therefore, in both the stage of the molding base material and the stage of the molded product, it is preferably 0.01 to 0.1 mm, more preferably 0.015 to 0.075 mm, and further preferably 0.015 to 0.05 mm.

Further, the partition layer interposed between the fiber-reinforced resin prepreg layer and the fiber paper layer preferably satisfies the following conditions:

(1) to integrate the prepreg layer and the fiber paper layer (complete integration is not necessary);

(2) to prevent the matrix resin of the prepreg layer from intruding deeply into the fiber paper layer (both at the base material stage and the molding stage);

(3) to prevent gas present in the gaps of the fiber paper layer from intruding deeply into the prepreg layer (both at the base material stage and the molding stage);

(4) to have the same degree of thermal resistance as a lower one among the thermal resistance of the cured substance of the prepreg layer or the thermal resistance of the fiber paper layer; and (5) to have the same degree of molding freedom as those of the prepreg layer and the fiber paper layer (bending, stretching, cutting and the like).

Thus, the molding base material has a basic stacked form (integrated form) of a fiber-reinforced resin prepreg layer, a fiber paper layer, and a partition layer interposed therebetween, and the molding base material having such a basic form can employ the following forms as more detailed specific forms:

(1) At the boundary between the prepreg layer and the partition layer:

The resin of the prepreg layer and the resin of the partition layer are mixed with each other, and the two layers are integrated.

The resin of the prepreg layer and the resin of the partition layer are in contact to each other, and the two layers are integrated.

(2) At the boundary between the partition layer and the fiber paper layer:

Only a part of the resin of the partition layer enters into the fiber paper layer in the thickness direction from the boundary surface thereof, and the two layers are integrated.

The resin of the partition layer is in contact with the boundary surface of the fiber paper layer, and the two layers are integrated.

In the molding base material, in addition to the above-described basic stacked form (integrated form), a form in which another layer is provided may be employed. For example, a form can be employed wherein a partition layer is provided on at least one surface of the fiber paper layer (referred to as a first fiber paper for convenience), and a fiber paper layer different from the above-described fiber paper layer (referred to as a second fiber paper for convenience) is provided between the partition layer and the fiber-reinforced resin prepreg layer. This second fiber paper preferably has high heat insulation and high thermal resistance. As the second fiber paper, the same polyimide fiber paper as aforementioned one can be used, or other fiber paper can also be used. As the other fiber paper, for example, can be used an aramid fiber paper, a polyphenylene sulfide paper, a ceramic fiber paper, and a fiber paper prepared by mixing these fibers.

By molding by heating and pressurizing the molding base material as described above, the fiber-reinforced resin prepreg layer is cured to obtain the molded product.

In the molded product, it is desired that the molded product has gaps of 30 to 90%, preferably 45 to 90%, more preferably 60 to 90% in the fiber paper layer to impart a targeted heat insulation. Namely, it is preferred that reduction of the porosity in the fiber paper layer of the molding base material before molding is suppressed as much as possible by the partition layer even during molding, and the porosity of the fiber paper layer in the molded product after molding is maintained within the above-described range so that an excellent heat insulation can be exhibited.

Further, it is desired that the glass transition temperature of the molded product after molding is 90 to 400° C., preferably 120 to 390° C., and more preferably 150 to 380° C.

The thermal conductivity of the fiber paper is 0.1 W/mK or less, preferably 0.07 W/mK or less, and more preferably 0.04 W/mK or less, as measured by a steady-state method.

Furthermore, in the molded product as described above, it is possible to add a specific layer especially to the surface to add a further function. For example, it can be a molded product having a metal layer on at least one surface layer. As the metal layer, a layer comprising aluminum, silver, gold, nickel, chromium and the like, is exemplified. By providing the metal layer, it becomes possible to impart a function such as radiant heat reflection and electromagnetic wave shielding to the surface layer of the molded product. When adding a specific layer to add a function, it is preferably added/carried out after the "molding step of heating and pressurizing the formed molding base material."

The molded product as described above can be produced by a production method comprising at least steps A to C:

A. preparing a molding base material as described above;

B. forming the molding base material into a target shape; and

C. heating and pressurizing the formed molding base material.

In a molded product using the molding base material, it becomes possible to thermally protect peripheral parts from a high-temperature heat source component due to its high heat insulation performance (for example, around an exhaust pipe of an internal combustion engine and the like). Further, since the fiber paper layer, which bears the heat insulation performance, is lighter than current heat insulation materials (glass cloth and ceramic sheets), weight reduction is possible as a molded product. Further, the molding base material after molding (molded product) can have both high heat insulation performance and high strength/high rigidity, while being thin. Furthermore, since the molding base material can be formed thin, it is possible to realize a compact heat-insulating and heat-resistant structure, and it becomes possible to minimize a gap relative to a high-temperature source together with excellent heat insulation and thermal resistance.

EXAMPLES

Hereinafter, examples will be explained. The materials and the like used in the examples and the methods of measuring and evaluating properties used in the explanation are as follows.

Materials Used in the Examples:

(1) As the prepreg for the fiber-reinforced resin, when the matrix resin was an epoxy resin, prepreg F6343B-05P supplied by Toray Industries, Inc. was used, and when the matrix resin was a cyanate ester resin, prepreg GG200T (T800-DT350CN) supplied by Delta-Preg S.p.A. Uninominale Corporation was used. In these fiber-reinforced resin prepregs, carbon fiber continuous fibers are used as reinforcing fibers.

(2) As the fiber paper layer, polyimide fiber paper supplied by Du Pont-Toray Co., Ltd. was used.

(3) As the partition layer, an epoxy-based adhesive sheet (AU type) supplied by Arisawa Seisakusho Co., Ltd. was used.

Stacking Forms in the Examples:

fiber paper layer/partition layer/fiber paper layer/partition layer/fiber paper layer/partition layer/fiber paper layer/partition layer/fiber-reinforced resin prepreg layer (Example 1)

fiber-reinforced resin prepreg layer/partition layer/fiber paper layer/partition layer/fiber paper layer/partition layer/fiber-reinforced resin prepreg layer (Example 2)

fiber-reinforced resin prepreg layer/partition layer/fiber paper layer/partition layer/fiber paper layer/partition layer/fiber paper layer/partition layer/fiber-reinforced resin prepreg layer (Example 3)

fiber-reinforced resin prepreg layer/partition layer/partition layer/fiber paper layer/partition layer/fiber paper layer/partition layer/fiber paper layer/partition layer/partition layer/fiber-reinforced resin prepreg layer (Example 4)

(1) Glass Transition Temperature (Stage after Molding):

The glass transition temperature of the cured portion of the fiber-reinforced resin prepreg layer in the molded product was measured at ASTM D7028 Modulus Tangent Intercept, 5° C./min.

(2) Porosity:

It was determined by the following equation from the thickness, weight, and density at an arbitrary place of the obtained fiber paper:

$$\text{porosity (\%)} = [1 - (\text{weight/thickness/material density})] \times 100.$$

(3) Layer Thickness:

The thickness (thickness of each layer and thickness of the molded product) was measured using a dial thickness gauge (FFG-12) supplied by Ozaki Seisakusho Co., Ltd.

(4) Heat Insulation:

The thermal conductivity of a sample was determined according to ASTM E1530 standard using a steady-state method thermal conductivity measuring device supplied by Advance Riko, Inc.

Example 1

In advance, the base materials were stacked to have a structure of fiber paper layer/partition layer/fiber paper layer/partition layer/fiber paper layer/partition layer/fiber paper layer, and the partition layers were cured by heating at 160° C. for 60 minutes to bond the fiber paper layers together (the bonded and integrated base material is referred to as "base material 4"). Thereafter, a partition layer (uncured) was stacked on one surface of the base material 4, and it was bonded and stacked while maintaining the semi-cured state (B stage), using an iron heated to 120° C. (this is referred to as "base material 5").

Next, a fiber-reinforced resin prepreg was placed on a flat-plate mold and aligned along the mold. Thereafter, the base material 5 was placed on the prepreg so that the semi-cured partition layer of the base material 5 was in contact with the prepreg, and similarly aligned along the shape of the mold (this is referred to as "base material 6").

The base material 6 was bagged with a sealing film together with the mold, and the inside was reduced in pressure by a vacuum pump to prepare a precursor (preform) of a molded product. Thereafter, the entire precursor of the molded product was cured in an autoclave under the following conditions to obtain a molded product. The glass transition temperature of the prepreg portion of the obtained molded product was 130° C.

Curing Conditions (Autoclave):

The entire precursor of the molded product was put into an autoclave, heated from a room temperature to 130° C. under a pressure of 5.0 bar, and then held at 130° C. for 3 hours. Then, after the temperature was lowered to 70° C., the whole molded product was taken out from the autoclave.

Example 2

In advance, the base materials were stacked to have a structure of fiber paper layer/partition layer/fiber paper layer, and the partition layer was cured by heating at 160° C. for 60 minutes to bond the fiber paper layers together (the bonded and integrated base material is referred to as "base material 1"). Thereafter, a partition layer (uncured) was stacked on each surface of the base material 1, and the partition layers were bonded and stacked while maintaining the semi-cured state (B stage), using an iron heated to 120° C. (this is referred to as "base material 2").

Next, a fiber-reinforced resin prepreg was placed on a hat-shaped mold and aligned along the mold. Then, the base material 2 was placed on the prepreg to be aligned along the shape of the mold, and thereafter, the prepreg was further placed on the base material 2 and similarly aligned along the mold (this is referred to as "base material 3").

The base material 3 was bagged with a sealing film, and the inside was reduced in pressure by a vacuum pump to prepare a precursor (preform) of a molded product. Thereafter, the entire precursor of the molded product was cured in an autoclave and then post-treated in an oven under the following conditions to obtain a molded product. The glass transition temperature of the prepreg portion of the obtained molded product was 355° C.

Curing Conditions (Autoclave):

The entire precursor of the molded product was put into an autoclave, heated from a room temperature to 125° C. at a rate of 1° C./min under a pressure of 4.0 bar, and then held at 125° C. for 3 hours. Then, after the temperature was lowered to 70° C. at a rate of 2° C./min, the whole molded product was taken out from the autoclave.

Post-Treatment Conditions (Oven):

The whole molded product taken out from the autoclave was put into an oven, heated from a room temperature to 125° C. at a rate of 2° C./min, then from 125° C. to 200° C. at a rate of 0.3° C./min, and held at 200° C. for 2 hours. Then, after the temperature was lowered to 70° C. at a rate of 2° C./min, the whole molded product was taken out from the oven.

Example 3

In advance, the base materials were stacked to have a structure of fiber paper layer/partition layer/fiber paper layer/partition layer/fiber paper layer, and the partition layers were cured by heating at 160° C. for 60 minutes to bond the fiber paper layers together (the bonded and integrated base material is referred to as "base material 7"). Thereafter, a partition layer (uncured) was stacked on each surface of the base material 7, and the partition layers were bonded and stacked while maintaining the semi-cured state (B stage), using an iron heated to 120° C. (this is referred to as "base material 8").

Next, a fiber-reinforced resin prepreg was placed on a hat-shaped mold and aligned along the mold. Then, the base material 8 was placed on the prepreg to be aligned along the shape of the mold and, thereafter, the prepreg was further placed on the base material 8 and similarly aligned along the mold (this is referred to as "base material 9").

The base material 9 was bagged with a sealing film, and the inside was reduced in pressure by a vacuum pump to prepare a precursor (preform) of a molded product. Thereafter, the entire precursor of the molded product was cured in an autoclave and then post-treated in an oven under the following conditions to obtain a molded product. The glass transition temperature of the prepreg portion of the obtained molded product was 355° C.

Curing Conditions (Autoclave):

The entire precursor of the molded product was put into an autoclave, heated from a room temperature to 125° C. at a rate of 1° C./min under a pressure of 4.0 bar, and then held at 125° C. for 3 hours. Then, after the temperature was lowered to 70° C. at a rate of 2° C./min, the whole molded product was taken out from the autoclave.

Post-Treatment Conditions (Oven):

The whole molded product taken out from the autoclave was put into an oven, heated from a room temperature to 125° C. at a rate of 2° C./min, then from 125° C. to 200° C. at a rate of 0.3° C./min, and held at 200° C. for 2 hours. Then, after the temperature was lowered to 70° C. at a rate of 2° C./min, the whole molded product was taken out from the oven.

Example 4

In advance, the base materials were stacked to have a structure of partition layer/fiber paper layer/partition layer/ fiber paper layer/partition layer/fiber paper layer/partition layer, and the partition layers were cured by heating at 160° C. for 60 minutes to bond the fiber paper layers together (the bonded and integrated base material is referred to as "base material 10"). Thereafter, a partition layer (uncured) was stacked on each surface of the base material 10, and the partition layers were bonded and stacked while maintaining the semi-cured state (B stage), using an iron heated to 120° C. (this is referred to as "base material 11").

Next, a fiber-reinforced resin prepreg was placed on a hat-shaped mold and aligned along the mold. Then, the base material 11 was placed on the prepreg to be aligned along the shape of the mold and, thereafter, the prepreg was further placed on the base material 11 and similarly aligned along the mold (this is referred to as "base material 12").

The base material 12 was bagged with a sealing film, and the inside was reduced in pressure by a vacuum pump to prepare a precursor (preform) of a molded product. There- after, the entire precursor of the molded product was cured in an autoclave and then post-treated in an oven under the following conditions to obtain a molded product. The glass transition temperature of the prepreg portion of the obtained molded product was 355° C.

Curing Conditions (Autoclave):

The entire precursor of the molded product was put into an autoclave, heated from a room temperature to 125° C. at a rate of 1° C./min under a pressure of 4.0 bar, and then held at 125° C. for 3 hours. Then, after the temperature was lowered to 70° C. at a rate of 2° C./min, the whole molded product was taken out from the autoclave.

Post-Treatment Conditions (Oven):

The whole molded product taken out from the autoclave was put into an oven, heated from a room temperature to 125° C. at a rate of 2° C./min, then from 125° C. to 200° C. at a rate of 0.3° C./min, and held at 200° C. for 2 hours. Then, after the temperature was lowered to 70° C. at a rate of 2° C./min, the whole molded product was taken out from the oven.

Comparative Example 1

A fiber-reinforced resin prepreg was placed on a flat-plate mold and aligned along the mold. Thereafter, a fiber paper was placed on the prepreg and aligned similarly along the shape of the mold (this is referred to as "base material 13").

The base material 13 was bagged with a sealing film together with the mold, and the inside was reduced in pressure by a vacuum pump to prepare a precursor (preform) of a molded product. Thereafter, the entire precursor of the molded product was cured in an autoclave under the fol- lowing conditions to obtain a molded product. The glass transition temperature of the prepreg portion of the obtained molded product was 130° C.

Curing Conditions (Autoclave):

The entire precursor of the molded product was put into an autoclave, heated from a room temperature to 130° C. under a pressure of 5.0 bar, and then held at 130° C. for 3 hours. Then, after the temperature was lowered to 70° C., the whole molded product was taken out from the autoclave.

Because the porosity in the fiber paper of the obtained molded product was 0%, the targeted heat insulation per- formance could not be expected.

Comparative Example 2

A fiber-reinforced resin prepreg was placed on a hat- shaped mold and aligned along the mold. Thereafter, the base material 11 was placed on the prepreg and aligned along the shape of the mold, and then the prepreg was placed on the base material 11 and similarly aligned along the mold (this is referred to as "base material 14").

The base material 14 was bagged with a sealing film together with the mold, and the inside was reduced in pressure by a vacuum pump to prepare a precursor (preform) of a molded product. Thereafter, the entire precursor of the molded product was cured in an autoclave under the fol- lowing conditions to obtain a molded product. The glass transition temperature of the prepreg portion of the obtained molded product was 130° C.

Curing Conditions (Autoclave):

The entire precursor of the molded product was put into an autoclave, heated from a room temperature to 130° C. under a pressure of 5.0 bar, and then held at 130° C. for 3 hours. Then, after the temperature was lowered to 70° C., the whole molded product was taken out from the autoclave.

Post-Processing:

A polyimide fiber paper adhesive tape separately prepared by coating an acrylic-based adhesive onto a polyimide fiber paper was cut and pasted in accordance with the shape of the above-described molded product, and a heat insulating layer of the polyimide fiber paper was formed on the surface.

Although the porosity in the polyimide fiber paper on the surface could be maintained to be high, the polyimide fiber paper could not be followed to the curved surface shape of the molded product, and floating of the fiber paper from the molded product and wrinkles of the fiber paper occurred. Further, the adhesion between the fiber paper and the molded product was unstable.

Conditions and results of each Example and Comparative Example are summarized in Table 1.

TABLE 1

| | | | Example 1 | Example 2 | Example 3 | Example 4 | Comparative Example 1 | Comparative Example 2 |
|---|---|---|---|---|---|---|---|---|
| Molding base material | Prepreg layer (one layer) | Kind of reinforcing fiber | carbon fiber | carbon fiber | carbon fiber | carbon fiber | carbon fiber | carbon fiber |
| | | Kind of matrix resin | epoxy resin | cyanate ester resin | cyanate ester resin | cyanate ester resin | epoxy resin | epoxy resin |
| | Fiber paper layer (one layer) | Kind of fiber | polyimide fiber | polyimide fiber | polyimide fiber | polyimide fiber | polyimide fiber | polyimide fiber |
| | | Porosity (%) | 84 | 84 | 64 | 64 | 84 | 64 |
| | | Thickness (mm) | 0.4 | 0.4 | 0.2 | 0.2 | 0.4 | 0.2 |
| | Partition layer (one layer) | Kind of resin | epoxy-based adhesive sheet | epoxy-based adhesive sheet | epoxy-based adhesive sheet | epoxy-based adhesive sheet | (none) | epoxy-based adhesive sheet |
| | | Thickness (μm) | 25 | 25 | 25 | 25 | (none) | 25 |
| Molded product | | Thickness (mm) | 1.2 | 1.4 | 1.4 | 1.4 | 0.7 | 0.9 |
| | | Glass transition temperature (° C.) | 130 | 355 | 355 | 355 | 130 | 130 |
| | | Porosity in fiber paper (%) | 64 | 64 | 51 | 51 | 0 | 84 |
| | | Thermal conductivity of molded product (W/mK) | 0.22 | 0.37 | 0.36 | 0.37 | 0.42 | 0.19 |

Example 5

On both surfaces of the molded product obtained in Example 2, an aluminum metal was evaporated heating and melting in a vacuum vapor deposition apparatus, the aluminum was coagulated and deposited on both surfaces of the molded product, 50 nm vapor deposition films were formed, and a molded product added with aluminum layers to the surfaces was obtained.

INDUSTRIAL APPLICABILITY

Our materials, molded products and methods can be applied to any application that requires both high-strength and high-rigidity properties of a fiber-reinforced resin and a high heat insulation performance due to a light-weight and thin-layer material, and it is suitable particularly for various types of mobility required with a light-weight and compact heat insulating/thermal resistant structure, and is also suitable for members or the like having a complicated shape.

The invention claimed is:

1. A molding base material comprising at least a fiber-reinforced resin prepreg layer, a fiber paper layer and a partition layer interposed between the prepreg layer and the fiber paper layer; wherein a resin is not impregnated into the fiber paper layer, wherein the partition layer is provided on at least one surface of the fiber paper layer, and another fiber paper layer different from said fiber paper layer is provided between the partition layer and the prepreg layer.

2. The molding base material according to claim 1, wherein the fiber paper layer comprises a polyimide fiber paper layer.

3. The molding base material according to claim 1, wherein the prepreg layer contains carbon fibers or glass fibers as reinforcing fibers.

4. The molding base material according to claim 1, wherein a matrix resin of the prepreg layer comprises a thermosetting resin.

5. The molding base material according to claim 1, wherein the partition layer comprises a thermosetting resin.

6. A molded product molded by heating and pressurizing the molding base material according to claim 1.

7. The molded product according to claim 6, having gaps of 30 to 90% in the fiber paper layer.

8. The molded product according to claim 6, wherein a glass transition temperature of the molded product is 90 to 400° C.

9. The molded product according to claim 6, wherein a thermal conductivity of the fiber paper layer is 0.1 W/mK or less.

10. The molded product according to claim 6, wherein a metal layer is provided on at least one surface layer.

11. The molded product according to claim 6, used for any application for automobiles, motorcycles, urban air mobility, aircraft and satellites.

12. A method of producing a molded product according to claim 6, comprising at least steps A to C:

A. preparing a molding base material comprising at least a fiber-reinforced resin prepreg layer, a fiber paper layer and a partition layer interposed between the prepreg layer and the fiber paper layer;

B. forming the molding base material into a target shape; and

C. heating and pressurizing the formed molding base material:

wherein a resin is not impregnated into the fiber paper layer, wherein the partition layer is provided on at least one surface of the fiber paper layer, and another fiber paper layer different from said fiber paper layer is provided between the partition layer and the prepreg layer.

* * * * *